Feb. 19, 1946.  I. F. SCHRECK  2,395,345
INDUSTRIAL TRUCK
Filed Sept. 10, 1942  2 Sheets-Sheet 1
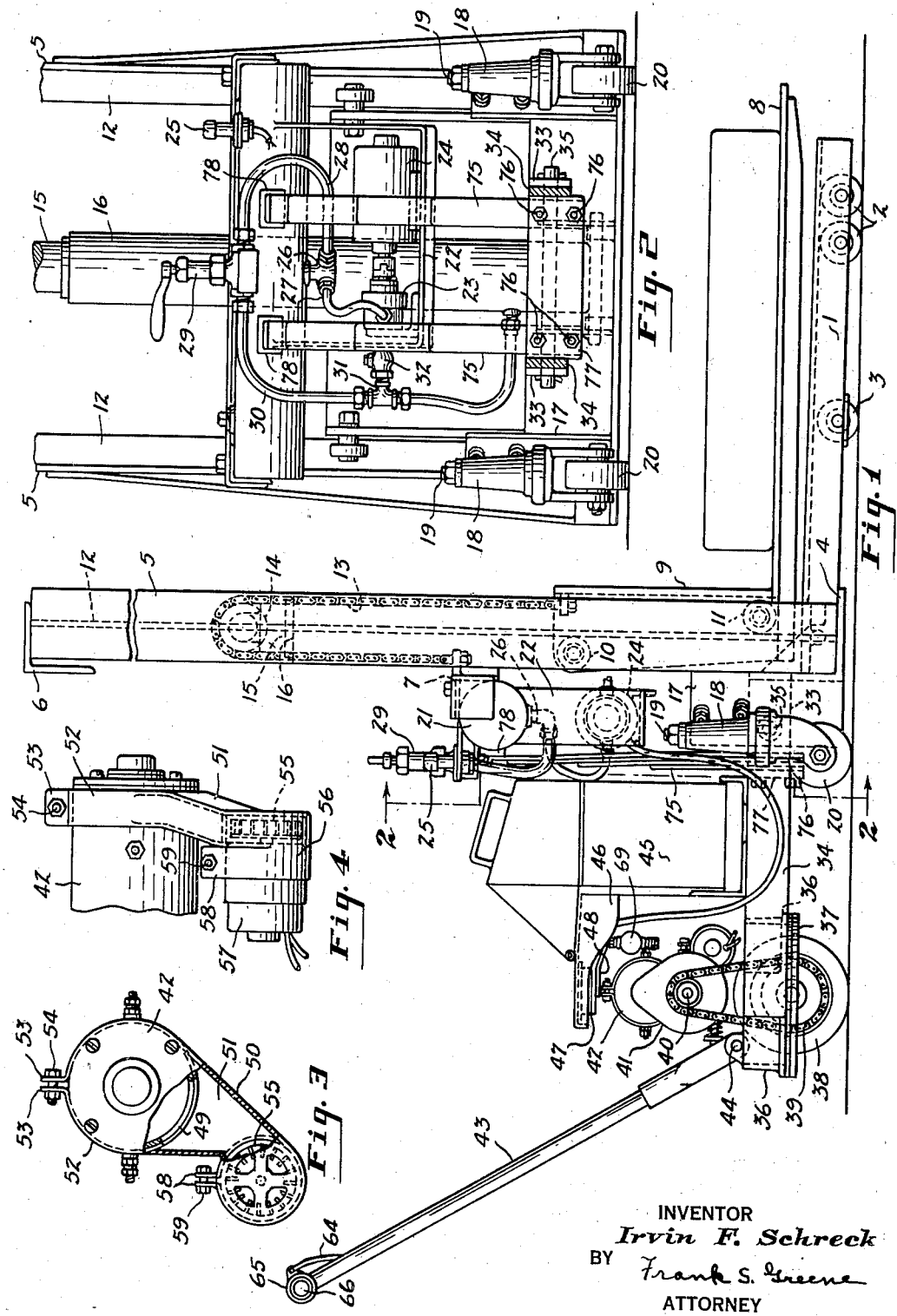
INVENTOR
Irvin F. Schreck
BY Frank S. Greene
ATTORNEY

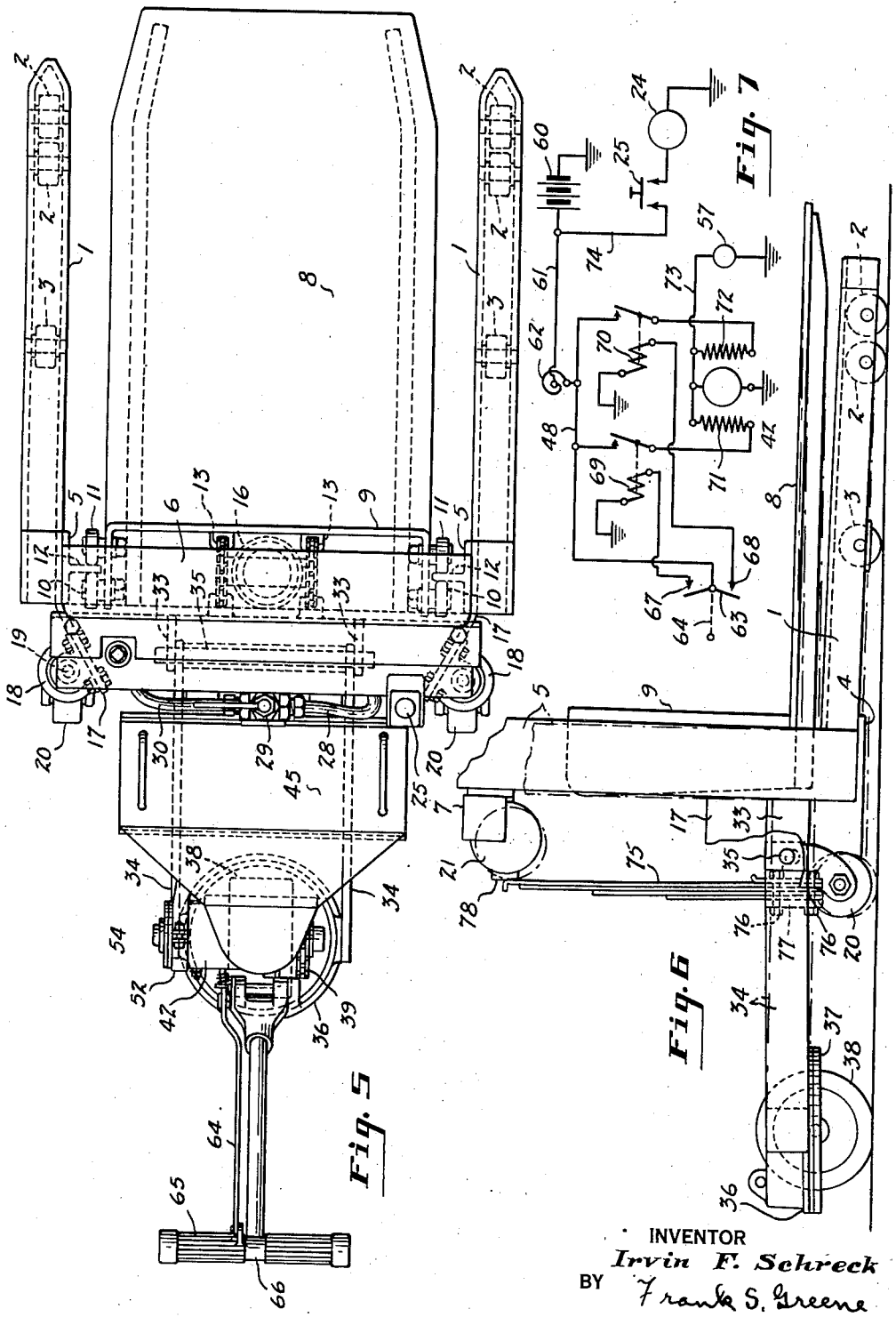

Patented Feb. 19, 1946

2,395,345

UNITED STATES PATENT OFFICE 2,395,345

INDUSTRIAL TRUCK

Irvin F. Schreck, Cleveland Heights, Ohio

Application September 10, 1942, Serial No. 457,846

17 Claims. (Cl. 187—9)

This invention relates to industrial trucks, and more particularly to trucks of the portable elevator type. The invention has for its object to provide a truck comprising a load carrying unit and a tractor unit which are so connected end to end that the units may rock vertically one with respect to the other so that effective traction may be maintained while the loaded truck is passing over humps on a floor surface such as the intersections of surfaces disposed at different inclinations; for example, the point where a ramp merges into a horizontal surface.

A further object of the invention is to provide a counterbalancing means for the pivotally connected units which exerts an upward thrust on the pivotally connected ends and maintains a substantial proportion of the weight of the truck and its load upon a traction wheel.

A further object of the invention is to provide a tractor unit which is adapted to be attached to a portable elevator and which is adapted to steer and propel the elevator and to supply power to the hoist mechanism of the elevator.

With the above and other objects in view the invention may be said to comprise the truck as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of a truck embodying the invention;

Fig. 2 is a section taken on the line indicated at 2—2 in Fig. 1;

Fig. 3 is an end elevation of the truck propelling motor and its cooling fan;

Fig. 4 is a side elevation of the motor and fan;

Fig. 5 is a top plan view of the truck;

Fig. 6 is a diagrammatic view showing the action of the counterbalancing spring; and Fig. 7 is a wiring diagram showing the motor circuits.

The truck of the present invention has a load carrying unit in the form of a portable elevator which has a base provided with spaced horizontal frame bars 1 which are in the form of downwardly facing channels. The bars 1 each have a pair of supporting wheels 2 mounted in the channel thereof adjacent the rear end and a wheel 3 mounted in its channel substantially midway between the ends of the bars. Adjacent the forward ends thereof, the bars 1 are connected by a cross bar 4 and have standards 5 rigidly attached thereto. The standards 5 are connected at their upper ends by a cross bar 6 and intermediate the top and bottom by a cross bar 7. A load carrying platform 8 is provided on a carriage 9 which is mounted for vertical movement between the standards 5. The standards 5 are T-shaped in cross section and the carriage 9 has upper and lower wheels 10 and 11 which engage on opposite sides of inwardly projecting webs 12 of the guide standards.

A pair of sprocket chains 13 are attached at one end to the carriage 9 and at the other to the cross bar 7 and extend over sprockets 14 which are supported upon the upper end of a vertically movable piston 15 projecting upwardly from a cylinder 16. The cylinder 16 is disposed vertically between the standards 5 and receives fluid under pressure to elevate the piston 15 and sprockets 14 to lift the carriage 9 and the load carrying platform 8. The platform 8 is of a width to enter the space between the side bars 1 while in its lowermost position so that the platform may be placed closely adjacent the floor to enter with the bars 1 beneath a pallet carrying the load to be transported. The platform 8 and carriage 9 may be partly or fully elevated during travel, and when unloading the platform 8 may be positioned at the desired height above the floor. Wing plates 17 are welded to the standards 5 and project forwardly from the standards 5. Bearing members 18 are attached to the plates 17 and receive the spindles 19 of caster wheels 20, which are the front supporting wheels of the load carrying unit.

The cross bar 7 provides a support for a liquid supply tank 21 which is attached to the bar 7. A bracket 22 welded to the tank 21 also provides a support for a pump 23 and electric motor 24, the motor 24 being controlled by a push button switch 25 mounted on the cross bar 7. The tank 21 has a T-shaped outlet fitting 26 to which is connected a pipe 27. The pipe 27 leads from the fitting 26 to the pump 23, and the pipe 28 leads from the other branch of the fitting to a hand valve 29, and a pipe 30 leads from the valve 29 to the lower end of the cylinder 16. The pump has an outlet 31 which connects to the pipe 30 and which is provided with a check valve 32.

If the pump 23 be operated while the valve 29 is closed, liquid is forced through the pipe 30 into the cylinder 16 to elevate the piston 15 and lift the carriage 9. When the motor 24 is stopped, the liquid in the cylinder and pipe 30 is trapped by the valves 29 and 32 and the load is retained in elevated position. The load may be lowered any time and the rate of lowering regulated by means of the hand operated valve 29, which may be opened as far as desired to allow liquid to flow through the pipe 28 to the tank 21 at the desired rate.

The bottom cross bar 4 of the elevator frame has forwardly projecting lugs 33 which receive the frame 34 of a tractor unit between them, the tractor unit being connected to the lugs 33 by a horizontal pivot pin 35. The tractor frame 34 is provided with a bearing annulus 36 adjacent its forward end which receives a swiveling frame 37 in which is mounted a traction wheel 38. The traction wheel 38 is driven by a sprocket chain 39 driven from a shaft 40 projected from a gear housing 41 which contains gearing driven by an electric motor 42. A steering tongue 43 is connected by horizontal pivot 44 to the swiveling frame 37, so that the traction wheel 38 may be turned by hand to steer the truck as it is being propelled over a floor surface. A battery box 45 is mounted on the truck frame 34 rearwardly of the swiveling frame 37 and this battery box carries a terminal bracket 46 provided with a contact portion 47 which is engaged by a bus bar 48 carried by the motor 42. Through the interengaging contact members, current is supplied from a battery in the box 45 to the propelling motor 42. Means is preferably provided for circulating air through the housing of the motor 42 to cool the same, the housing being provided, as shown in Fig. 3, with a peripheral opening 49 adjacent one end thereof through which air may enter. A fan casing 50 is supported on the motor 42 in position to deliver air into the opening 49, and this casing has an outlet portion 51 provided with integral curved extensions 52 which are adapted to embrace the motor housing and which are provided with end flanges 53 to receive a clamping bolt 54. By means of the integral clamping means the fan casing is secured upon the end of the motor housing with the fan outlet in register with the opening 49 in the housing. A fan 55 is received within the fan housing and the fan receiving portion of the housing is provided with a lateral extension 56 which is transversely split to provide a clamp for a motor 57 which drives the fan 55.

The clamping portion 56 has projecting flanges 58 which receive a clamping bolt 59 which serve to draw the clamping portion 56 tightly about the housing of the motor 57. The fan casing thus provides a bracket for supporting the fan and auxiliary motor in operative position with respect to the main propelling motor.

Referring particularly to Fig. 7, a battery 60 mounted in the box 45 is connected by a wire 61 to a spiral conductor and contact member 62 mounted in the contact portion 47 and contacting with bus bar 48. A pivoted switch 63 is operated by a rod 64 mounted on the tongue 43 and connected to a sleeve 65 on a handgrip portion 66 of the tongue 43. The switch 63 is rocked in one direction or the other by turning movements of the sleeve 65 and engages upon movement in one direction with a contact member 67 and upon movement in the opposite direction with a contact member 68. Engagement of the switch 63 with the contact member 67 closes the circuit of a relay 69, which closes a circuit through a coil 71 of the propelling motor 42. Engagement of the switch 63 with the contact 68 energizes a relay 70 which controls the flow of current through a coil 72 of the motor 42. Engagement of the switch 63 with the contact 68 energizes a relay 70 which controls the flow of current through a coil 72 of the motor 42. Coils 71 and 72 are the forward and reverse coils of the motor so that the motor is operated in a forward or reverse direction depending upon the direction in which the sleeve 65 is turned. A wire 73 connects the fan motor 57 in parallel with the forward and reverse coils 71 and 72 of the propelling motor 42, so that the unidirectional fan motor is operated simultaneously with the propelling motor when the propelling motor is operated forwardly or rearwardly.

By connecting the frame 34 of the tractor unit by means of the horizontal pivot 35 to the elevator, the tractor unit is free to swing up or down with respect to the wheel supported elevator and since the weight of the tractor unit with its driving mechanism is substantially all forwardly of the pivot 35, a substantial amount of weight will be imposed upon the tractor wheel regardless of irregularities in the surface over which the truck is traveling. For propelling heavy loads, however, it is desirable that a substantial proportion of the weight of the load carrying unit, as well as the weight of the tractor unit, be imposed upon the traction wheel. For this reason, means is provided for counterbalancing the pivotally connected ends of the load carrying and tractor units so that a substantial upward thrust is exerted upon the pivotally connected ends of the two units.

As herein shown, the counterbalancing means is in the form of a pair of leaf springs 75 which are rigidly attached by means of bolts 76 to a cross bar 77 of the tractor frame 34 forwardly of the pivot 35. The upper free ends of the springs 75 bears against buffer blocks 78 attached to the liquid supply tank 21. The springs are so disposed that they are flexed forwardly by the buffer blocks 78 when the forward elevator supporting wheels 20 are in engagement with the floor surface, as shown in Fig. 1. The amount of flexure of the spring 75 necessary to permit full engagement of the elevator supporting wheels with the floor surface is sufficient to exert a substantial amount of downward thrust upon the traction wheel 38 and a rearward thrust on the standards 5, tending to rock the forward portion of the elevator upwardly.

As shown in Fig. 6 of the drawings, the thrust of the counterbalancing spring 75 may be sufficient to lift the forward elevator supporting wheels 20 slightly off the floor when the truck is empty. When a heavy load is placed upon the platform 8 the weight is sufficient to force the forward end of the load carrying unit downwardly until the wheels 20 engage the floor, flexing the springs 75 and transmitting a substantial proportion of the load to the traction wheel 38. Thus, when the truck is heavily loaded, a substantial portion of the weight is imposed upon the traction wheel 38 regardless of the contour of the surface over which the wheel is moving. For example, in passing from a ramp to a horizontol surface, the tractor unit may be disposed at an inclination while the base bars 1 of the elevator are horizontal. Nevertheless, effective traction is maintained by reason of the pressure exerted through the spring 75 upon the traction wheels.

The wheels 2 and 3 are of small diameter in order to permit the bars 1 to enter beneath a load carrying pallet and a pair of wheels 2 is provided at the ends of each of the bars 1 so that there will be less likelihood of engagement of a bar 1 with the floor due to the entry of a wheel into a depression in the floor. The wheels 3 provide additional support in case there should be a hole or depression in a floor large enough to receive the wheels 2.

The steering of the elevator unit by the swiveling of the traction wheel is facilitated by the caster wheels 20 at the forward end of the elevator base which will readily turn to positions parallel with the traction wheel as the elevator unit is being pushed by the tractor unit.

It is to be understood that variations and modifications of the specific devices herein shown and described for purposes of illustration, may be made without departing from the spirit of the invention.

What I claim is:

1. A lift truck comprising a tractor unit and a load carrying unit having frames pivotally connected end to end for vertical rocking movements, supporting wheels for each of said frames spaced from the connected ends, means for limiting the downward movement of the pivotally connected ends, and counterbalancing means acting upon the pivotally connected ends of said frames and maintaining an upward thrust upon the pivotally connected ends of said frames.

2. A lift truck comprising a load carrying unit having supporting wheels at one end, a tractor unit having a power driven tractor wheel adjacent one end thereof, means pivotally connecting the opposite ends of said units together for relative vertical rocking movements, means for limiting the downward movement of the pivotally connected ends, and a spring interposed between the pivotally connected ends of said units and maintaining an upward thrust upon said ends.

3. A lift truck comprising a load carrying unit having supporting wheels at one end, a tractor unit having a power driven tractor wheel adjacent one end thereof, means pivotally connecting the opposite ends of said units together for relative vertical rocking movements, means for limiting the downward movement of the pivotally connected ends, and a leaf spring attached at one end to said tractor unit and having its opposite end engaging said load carrying unit, said spring being arranged to normally hold the connected ends of said units in an elevated position.

4. A lift truck comprising a load carrying unit having supporting wheels at one end, a tractor unit having a power driven tractor wheel adjacent one end thereof, means pivotally connecting the opposite ends of said units together for relative vertical rocking movements, means for limiting the downward movement of the pivotally connected ends, a standard on the load carrying unit adjacent the pivoted end thereof, a leaf spring fixed at its lower end to said tractor unit and exerting a pressure at its upper end against said standard to resist downward movements of said pivoted ends.

5. A lift truck comprising a load carrying unit having supporting wheels at one end, a tractor unit having a power driven tractor wheel adjacent one end thereof, means pivotally connecting the opposite ends of said units together for relative vertical rocking movements, supporting wheels on one of said units adjacent the pivoted end thereof, and counterbalancing means acting upon the pivotally connected ends of the units and exerting an upward thrust on the pivotally connected ends of said units.

6. A lift truck comprising a load carrying unit having supporting wheels at one end, a tractor unit having a power driven tractor wheel adjacent one end thereof, means pivotally connecting the opposite ends of said units together for relative vertical rocking movements, supporting wheels on the load carrying unit adjacent the pivoted end thereof, and yieldable pressure applying means acting upon the pivotally connected ends of said units and arranged to apply a downward thrust on the tractor wheel and an upward thrust upon the pivoted ends of the units.

7. A lift truck comprising a tractor unit having a swiveled traction wheel at one end, a steering tongue connected to said traction wheel, means for driving said wheel, a load carrying unit pivotally connected to the opposite end of the tractor unit to swing vertically with respect thereto, supporting wheels at opposite ends of said load carrying unit, and counterbalancing means acting upon the pivotally connected ends of said units and exerting an upward thrust upon the interconnected ends of said units.

8. A lift truck comprising a tractor unit having a swiveled traction wheel at one end, a steering tongue connected to said traction wheel, means for driving said wheel, a load carrying unit pivotally connected to the said opposite end of the tractor unit to swing vertically with respect thereto, supporting wheels at opposite ends of said load carrying unit, a standard on the load carrying unit adjacent the pivoted end thereof, a leaf spring fixed at its lower end to the tractor unit and having its upper end disposed to exert a lateral pressure against said standard whereby the weight of the load carrying unit exerts a thrust on said spring which is transmitted to the traction wheel.

9. An industrial truck comprising a portable elevator having a guide standard, arms extending forwardly and rearwardly from opposite sides of said standard, supporting wheels on said arms forwardly and rearwardly of the standard, a carriage mounted to travel up and down on said standard, a load carrying platform on the carriage, means for lifting and lowering the carriage, a tractor unit having a rear end portion between the front supporting wheels of the elevator and connected to the elevator adjacent the base of the standard by a horizontal pivot, a traction wheel on the tractor unit adjacent its forward end, means for driving said wheel, and a spring interposed between the elevator and tractor unit and exerting a thrust on said tractor unit and elevator forwardly and rearwardly of said horizontal pivot and tending to lift said forward elevator supporting wheels off the ground.

10. An industrial truck comprising a portable elevator having a guide standard, arms extending forwardly and rearwardly from opposite sides of said standard, supporting wheels on said arms forwardly and rearwardly of the standard, a carriage mounted to travel up and down on said standard, a load carrying platform on the carriage, means for lifting and lowering the carriage, a tractor unit having a rear end portion between the front supporting wheels of the elevator and connected to the elevator adjacent the base of the standard by a horizontal pivot, a traction wheel on the tractor unit adjacent its forward end, means for driving said wheel, and means interposed between the elevator and the tractor unit for counterbalancing weight normally imposed upon the forward elevator supporting wheels and tending to lift said forward elevator supporting wheels off the ground.

11. An industrial truck comprising a portable elevator having a guide standard, arms extending forwardly and rearwardly from opposite sides of said standard, supporting wheels on said arms forwardly and rearwardly of the standard, a carriage mounted to travel up and down on said standard, a load carrying platform on the carriage, a tractor unit having a rear end portion between the front supporting wheels of the elevator and connected to the elevator by a horizontal pivot, a traction wheel on the tractor unit, means for driving said wheel, a leaf spring rigidly attached at its lower end to the tractor unit, forwardly of said pivot and exerting a pressure in a rearward direction at its upper end against said standard, the upper end of said spring being deflected forwardly by the standard when the connecting pivot is in its lowermost position.

12. A lift truck comprising a load carrying unit and a tractor unit, a horizontal pivot connecting the rear end of the tractor unit to the front end of the load carrying unit, supporting wheels at the ends of said units remote from the pivot, a spring interposed between said units and exerting a thrust upon said units tending to rock the same upwardly on said supporting wheels and lift the pivot, and means for limiting the downward movement of said pivot.

13. A lift truck comprising a load carrying unit and a tractor unit, a horizontal pivot connecting the rear end of the tractor unit to the front end of the load carrying unit, supporting wheels at the ends of said units remote from the pivot, a spring interposed between said units and exerting a thrust upon said units tending to rock the same upwardly on said supporting wheels and lift the pivot, and wheels attached to one of the units adjacent the pivot and movable into and out of engagement with the ground.

14. A lift truck comprising a tractor unit and a load carrying unit having frames pivotally connected end to end for vertical rocking movements, supporting wheels for each of said frames spaced from the connected ends thereof, a spring interposed between said frames and exerting pressure on said frames in directions tending to rock both frames downwardly with respect to said pivot and acting to normally hold the pivoted ends of said frames in an elevated position, and wheels carried by one of said frames adjacent the pivot and movable into and out of engagement with the ground.

15. A lift truck comprising a tractor unit having a traction wheel at one end mounted to swing about a vertical axis, means for swinging said wheel to steer the truck, means for driving said wheel, a load carrying unit having one end pivotally connected to the opposite end of said tractor unit to swing vertically with respect to said tractor unit, supporting wheels at the end of the load carrying unit remote from its pivoted end, a spring interposed between said units and exerting pressure thereon tending to rock the wheel supported ends thereof downwardly and lift said pivoted ends, castor wheels carried by one of said units adjacent its pivoted end and movable into and out of engagement with the ground.

16. An industrial truck comprising a portable elevator having a guide standard, parallel spaced arms extending rearwardly from the lower end portion of the standard, supporting wheels on said arms, a load carrying platform mounted for vertical movement on said standard, the platform in its lowermost position being positioned between said arms, a tractor unit having its forward end connected to the elevator adjacent the lower end of the standard by a horizontal pivot, a traction wheel on said unit swiveled to swing about a vertical axis, means for driving said traction wheel, means for swinging the traction wheel about its vertical axis to steer the truck, and spring means interposed between the elevator standard and said traction unit for exerting thrusts upon the elevator and traction unit tending to rock both downwardly about said horizontal pivot.

17. An industrial truck comprising a portable elevator having a guide standard, parallel spaced arms extending rearwardly from the lower end portion of the standard, supporting wheels on said arms, a load carrying platform mounted for vertical movement on said standard, the platform in its lowermost position being positioned between said arms, a tractor unit having its forward end connected to the elevator adjacent the lower end of the standard by a horizontal pivot, a traction wheel on said unit swiveled to swing about a vertical axis, means for driving said traction wheel, means for swinging the traction wheel about its vertical axis to steer the truck, spring means interposed between the elevator standard and said traction unit for exerting thrusts upon the elevator and traction unit tending to rock both downwardly about said horizontal pivot, arms extending forwardly from the lower end of said standard on opposite sides of the tractor unit, and castor wheels carried by said arms.

IRVIN F. SCHRECK.